(12) United States Patent
Scott et al.

(10) Patent No.: US 10,824,345 B2
(45) Date of Patent: Nov. 3, 2020

(54) SYSTEMS AND METHODS FOR STORING OBJECT STATE ON HASH CHAINS

(71) Applicants: Glenn Carter Scott, Los Altos Hills, CA (US); Roger Meike, Emerald Hills, CA (US); Michael Richard Gabriel, Portola Valley, CA (US)

(72) Inventors: Glenn Carter Scott, Los Altos Hills, CA (US); Roger Meike, Emerald Hills, CA (US); Michael Richard Gabriel, Portola Valley, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 16/204,900

(22) Filed: Nov. 29, 2018

(65) Prior Publication Data
US 2020/0174679 A1    Jun. 4, 2020

(51) Int. Cl.
*H04L 29/06* (2006.01)
*G06F 3/06* (2006.01)
*H04L 9/06* (2006.01)

(52) U.S. Cl.
CPC ............ *G06F 3/0619* (2013.01); *G06F 3/064* (2013.01); *G06F 3/0659* (2013.01); *G06F 3/0673* (2013.01); *H04L 9/0643* (2013.01); *H04L 2209/38* (2013.01)

(58) Field of Classification Search
CPC ....... G06N 7/08; G06F 16/13; H04L 63/0428; G06Q 20/3223
See application file for complete search history.

(56) References Cited

U.S. PATENT DOCUMENTS

| | | | |
|---|---|---|---|
| 2014/0259123 A1* | 9/2014 | Haynes | G06F 16/13 726/4 |
| 2017/0228734 A1* | 8/2017 | Kurian | G06Q 20/3223 |
| 2018/0139186 A1* | 5/2018 | Castagna | H04L 63/0428 |
| 2019/0155795 A1* | 5/2019 | Xiao | G06F 16/28 |
| 2019/0179801 A1* | 6/2019 | Jang | G06F 16/1865 |
| 2019/0377491 A1* | 12/2019 | Hallak | G06N 7/08 |

OTHER PUBLICATIONS

Palai et al., "Empowering Light Nodes in Blockchains with Block Summarization", 2018 9th IFIP International Conference on New Technologies, Mobility and Security (NTMS), Feb. 26-28, 2018 (Year: 2018).*
Gao et al., "Blockchain Storage Analysis and Optimization of Bitcoin Miner Node", 2018 International Conference on Communications, Signal Processing, and Systems, Dalian, China, Jul. 14-16, 2018. (Year: 2018).*

* cited by examiner

*Primary Examiner* — Ryan Bertram
*Assistant Examiner* — Trang K Ta
(74) *Attorney, Agent, or Firm* — Ferguson Braswell Fraser Kubasta PC

(57) ABSTRACT

A method for storing object state on hash chains. A read request that includes a received field name is received by an object with a plurality of fields. A field value that corresponds to the received field name is retrieved from a hash chain of the object by traversing the hash chain. A block is found that includes the field value from the plurality of field values that corresponds to the received field name. A response to the read request that includes the field value is generated and transmitted.

25 Claims, 12 Drawing Sheets

| | | | | | | |
|---|---|---|---|---|---|---|
| 402→ Block 0 | Chain 1 416 | Hash 0 418 | Chain 1 : Block 0 420 | | | |
| 404→ Block 1 | Chain 1 422 | Hash 1 424 | Chain 1 : Block 0 426 | Field 1 428 | | |
| 406→ Block 2 | Chain 1 430 | Hash 2 432 | Chain 1 : Block 1 434 | Field 2 436 | | |
| 408→ Block 3 | Chain 1 438 | Hash 3 440 | Chain 1 : Block 2 442 | Field 3 444 | Field 1 446 | Field 2 448 |
| 410→ Block 4 | Chain 1 446 | Hash 4 448 | Chain 1 : Block 3 450 | Field 2 452 | | |
| 412→ Block 5 | Chain 1 454 | Hash 5 456 | Chain 1 : Block 4 458 | Field 3 460 | | |
| 414→ Block 6 | Chain 1 462 | Hash 6 464 | Chain 1 : Block 5 466 | Field 3 468 | Field 1 470 | Field 2 472 |

502→ Block 0

| Chain 2 506 | Hash 0 508 | Chain 2 : Block 0 510 | |
|---|---|---|---|
| Chain 2 512 | Hash 1 514 | Chain 2 : Block 0 516 | Field 1 518 |

504→ Block 1

500↗

522→ Block 0

| Chain 3 528 | Hash 0 530 | Chain 3 : Block 0 532 | |
|---|---|---|---|
| Chain 3 534 | Hash 1 536 | Chain 3 : Block 0 538 | Field 2 540 |
| Chain 3 542 | Hash 2 544 | Chain 3 : Block 1 546 | Field 2 548 |

524→ Block 1

526→ Block 2

520↗

552→ Block 0

| Chain 4 560 | Hash 0 562 | Chain 4 : Block 0 564 | |
|---|---|---|---|
| Chain 4 566 | Hash 1 568 | Chain 4 : Block 0 570 | Field 3 572 |
| Chain 4 574 | Hash 2 576 | Chain 4 : Block 1 578 | Field 3 580 |
| Chain 4 582 | Hash 3 584 | Chain 4 : Block 2 586 | Field 3 588 |

554→ Block 1

556→ Block 2

558→ Block 3

| | | | | |
|---|---|---|---|---|
| 602 → Block 0 | Chain 5<br>616 | Hash 0<br>618 | Chain 5 : Block 0<br>620 | |
| 604 → Block 1 | Chain 5<br>622 | Hash 1<br>624 | Chain 5 : Block 0<br>626 | Field 1<br>628 |
| 606 → Block 2 | Chain 5<br>630 | Hash 2<br>632 | Chain 5 : Block 1<br>634 | Field 2<br>636 |
| 608 → Block 3 | Chain 5<br>638 | Hash 3<br>640 | Chain 5 : Block 2<br>642 | Field 3<br>644 |
| 610 → Block 4 | Chain 5<br>646 | Hash 4<br>648 | Chain 5 : Block 3<br>650 | Field 2<br>652 |
| 612 → Block 5 | Chain 5<br>654 | Hash 5<br>656 | Chain 5 : Block 4<br>658 | Field 3<br>660 |
| 614 → Block 6 | Chain 5<br>662 | Hash 6<br>664 | Chain 5 : Block 5<br>666 | Field 3<br>668 |

600 ↗

| Chain 5 : Block 1<br>672 | Chain 5 : Block 4<br>674 | Chain 5 : Block 6<br>676 |
|---|---|---|

| | | | | | | | |
|---|---|---|---|---|---|---|---|
| 702→ Block 0 | Chain 6<br>716 | Hash 0<br>718 | Chain 6 : Block 0<br>720 | | | | |
| 704→ Block 1 | Chain 6<br>722 | Hash 1<br>724 | Chain 6 : Block 0<br>726 | Chain 2 : Block 1<br>728 | | | |
| 706→ Block 2 | Chain 6<br>730 | Hash 2<br>732 | Chain 6 : Block 1<br>734 | Chain 2 : Block 1<br>736 | Chain 3 : Block 1<br>738 | | |
| 708→ Block 3 | Chain 6<br>740 | Hash 3<br>742 | Chain 6 : Block 2<br>744 | Chain 2 : Block 1<br>746 | Chain 3 : Block 1<br>748 | Chain 4 : Block 1<br>750 | |
| 710→ Block 4 | Chain 6<br>752 | Hash 4<br>754 | Chain 6 : Block 3<br>756 | Chain 2 : Block 1<br>758 | Chain 3 : Block 2<br>760 | Chain 4 : Block 1<br>762 | |
| 712→ Block 5 | Chain 6<br>764 | Hash 5<br>766 | Chain 6 : Block 4<br>768 | Chain 2 : Block 1<br>770 | Chain 3 : Block 2<br>772 | Chain 4 : Block 2<br>774 | |
| 714→ Block 6 | Chain 6<br>776 | Hash 6<br>778 | Chain 6 : Block 5<br>780 | Chain 2 : Block 1<br>782 | Chain 3 : Block 2<br>784 | Chain 4 : Block 3<br>786 | |

| | Chain 7 816 | Hash 0 817 | Chain 7 : Block 0 818 | | |
|---|---|---|---|---|---|
| 802 → Block 0 | | | | | |
| 804 → Block 1 | Chain 7 819 | Hash 1 820 | Chain 7 : Block 0 821 | Hash 1 823 | Chain 8 822 | Chain 7 : Block 0 824 | Field 1 825 |
| 806 → Block 2 | Chain 7 826 | Hash 2 827 | Chain 7 : Block 1 828 | Hash 1 830 | Chain 9 829 | Chain 7 : Block 0 831 | Field 2 832 |
| 808 → Block 3 | Chain 7 833 | Hash 3 834 | Chain 7 : Block 2 835 | Hash 1 837 | Chain 10 836 | Chain 7 : Block 0 838 | Field 3 839 |
| 810 → Block 4 | Chain 7 840 | Hash 4 841 | Chain 7 : Block 3 842 | Hash 2 844 | Chain 9 843 | Chain 9 : Block 1 845 | Field 2 846 |
| 812 → Block 5 | Chain 7 847 | Hash 5 848 | Chain 7 : Block 4 849 | Hash 2 851 | Chain 10 850 | Chain 10 : Block 1 852 | Field 3 853 |
| 814 → Block 6 | Chain 7 854 | Hash 6 855 | Chain 7 : Block 5 856 | Hash 3 858 | Chain 10 857 | Chain 10 : Block 2 859 | Field 3 860 |

800 ↗

| Chain 7 : Block 6 864 | Chain 8 : Block 1 866 | Chain 9 : Block 2 868 | Chain 10 : Block 3 870 |
|---|---|---|---|

862 ↗

| Chain 7 : Block 1 874 | Chain 7 : Block 4 876 | Chain 7 : Block 6 878 |
|---|---|---|

| | | | | | | | |
|---|---|---|---|---|---|---|---|
| 902→ Block 0 | Chain 11 916 | Hash 0 917 | Chain 11 : Block 0 918 | | | | |
| 904→ Block 1 | Chain 11 919 | Hash 1 920 | Chain 11 : Block 0 921 | Chain 12 922 | Hash 1 923 | Chain 11 : Block 0 924 | Field 1 925 |
| 906→ Block 2 | Chain 11 926 | Hash 2 927 | Chain 11 : Block 1 928 | Chain 13 929 | Hash 1 930 | Chain 11 : Block 0 931 | Field 2 932 | Chain 12 : Block 1 933 |
| 908→ Block 3 | Chain 11 934 | Hash 3 935 | Chain 11 : Block 2 936 | Chain 14 937 | Hash 1 938 | Chain 11 : Block 0 939 | Field 3 940 | Chain 12 : Block 1 941 | Chain 13 : Block 1 942 |
| 910→ Block 4 | Chain 11 943 | Hash 4 944 | Chain 11 : Block 3 945 | Chain 13 946 | Hash 2 947 | Chain 13 : Block 1 948 | Field 2 949 | Chain 12 : Block 1 950 | Chain 14 : Block 1 951 |
| 912→ Block 5 | Chain 11 952 | Hash 5 953 | Chain 11 : Block 4 954 | Chain 14 955 | Hash 2 956 | Chain 14 : Block 1 957 | Field 3 958 | Chain 12 : Block 1 959 | Chain 13 : Block 2 960 |
| 914→ Block 6 | Chain 11 961 | Hash 6 962 | Chain 11 : Block 5 963 | Chain 14 964 | Hash 3 965 | Chain 14 : Block 2 966 | Field 3 967 | Chain 12 : Block 1 968 | Chain 13 : Block 2 969 |

SYSTEMS AND METHODS FOR STORING OBJECT STATE ON HASH CHAINS

BACKGROUND

Computer programming objects store information with sets of fields. The state of an object is determined by the values for the fields of the object. Hash chains may be used within objects to store historical field values and states of the object. Storing the field values and states of an object using hash chains may require large amounts of storage space to hold multiple copies of field values and may require traversing significant portions of the hash chains to retrieve the values of particular fields and the state of an object. Better methods are needed for storing field values in hash chains without consuming large amounts of storage space and for retrieving the values and states of an object without the need to traverse significant portions of the hash chains.

SUMMARY

In general, in one aspect, embodiments are related to a method for storing object state on hash chains. A read request that includes a received field name is received by an object with a plurality of fields. A field value that corresponds to the received field name is retrieved from a hash chain of the object by traversing the hash chain. A summary block that includes a plurality of field values is found before finding a single value block that includes a single field value from the plurality of field values that corresponds to the received field name. A response to the read request that includes the field value is generated and transmitted.

In general, in one aspect, embodiments are related to a method for storing object state on hash chains. A read request that includes a received field name is received by an object with a plurality of fields. A field value that corresponds to the received field name is retrieved from a hash chain of the object by: identifying the hash chain from a plurality of hash chains of the object that corresponds to the received field name and identifying the end block of the hash chain that includes the field value that corresponds to the received field name. A response to the read request is generated that includes the field value from the end block of the hash chain identified from the plurality of hash chains.

In general, in one aspect, embodiments are related to a method for storing object state on hash chains. A read request that includes a received field name is received by an object with a plurality of fields. A field value that corresponds to the received field name is retrieved from a hash chain of the object by: identifying an object field block identifier that corresponds to the received field name and is stored separately from the hash chain by the object and identifying a block that contains the field value and that is in the hash chain using the object field block identifier without traversing the hash chain. A response to the read request that includes the field value is generated and transmitted.

In general, in one aspect, embodiments are related to a method for storing object state on hash chains. A read request that includes a received field name is received by an object with a plurality of fields. A field value that corresponds to the received field name is retrieved from a first hash chain of a plurality of hash chains of the object by: traversing a second hash chain of the plurality of hash chains to locate a second block of the second hash chain that corresponds to the received field name and that includes a field block identifier that identifies a first block of the first hash chain and identifying the first block of the first hash chain that contains the field value with the field block identifier from the second block. A response to the read request that includes the field value is generated and transmitted.

In general, in one aspect, embodiments are related to a system for storing object state on hash chains. The system includes a memory coupled to a processor. The memory includes an object with a plurality of fields. The object includes a plurality of hash chains that includes a history hash chain and a plurality of field hash chains. The plurality of hash chains includes a block that includes a field value. The block is included in the history hash chain and a field hash chain of the plurality of field hash chains. The object executes on the processor and uses the memory. A read request that includes a received field name is received by the object. The field value, which corresponds to the received field name from a field hash chain of the object, is retrieved. A response to the read request that includes the field value is generated and transmitted.

Other aspects of the invention will be apparent from the following description and the appended claims.

BRIEF DESCRIPTION OF DRAWINGS

FIG. 4, FIG. 5, FIG. 6, FIG. 7, FIG. 8, and FIG. 9 show examples in accordance with one or more embodiments of the present disclosure.

DETAILED DESCRIPTION

Figure 1A:
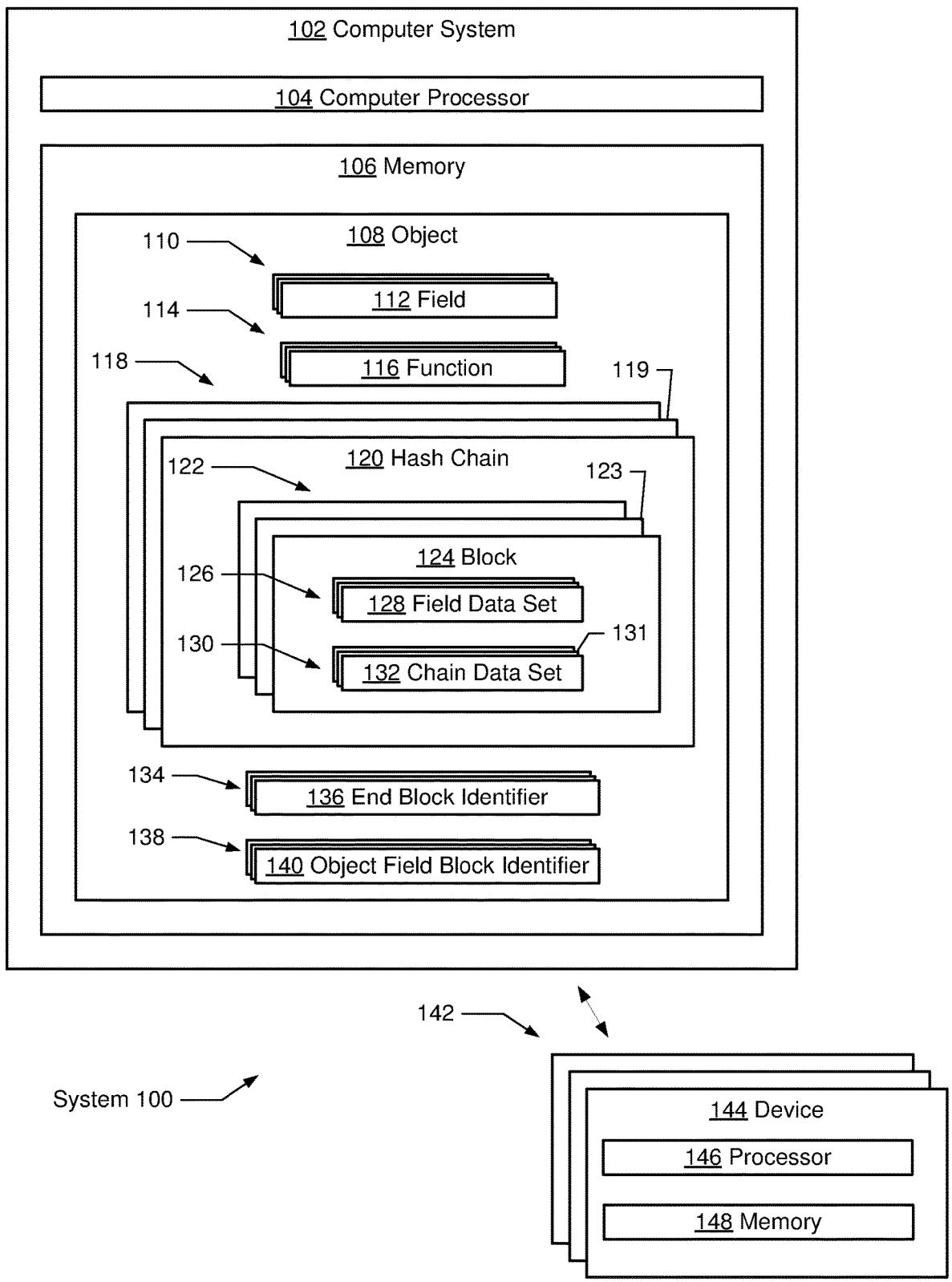
FIG. 1A, FIG. 1B, FIG. 1C, and FIG. 1D show a system in accordance with one or more embodiments of the present disclosure.

Specific embodiments will now be described in detail with reference to the accompanying figures Like elements in the various figures are denoted by like reference numerals for consistency.

In the following detailed description of embodiments, numerous specific details are set forth in order to provide a more thorough understanding. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments that are in accordance with the disclosure include objects that store field values in a hash chain. The hash chain includes blocks that store individual updates to the values of the fields of the object so that one block has one value for one field. The hash chain also includes summary blocks where the current values of the fields are copied forward into the summary blocks so that the summary blocks provide the entire state of the fields of the object. Including summary blocks reduces the number of blocks that needs to be traversed in order to determine the values for the fields and the state of the object.

In general, embodiments that are in accordance with the disclosure include objects that store field values in multiple hash chains or field hash chains. The fields of the object have a one-to-one correspondence to the hash chains so that each field may have its own hash chain. The current state of the object is immediately available by accessing the end blocks of the hash chains.

In general, embodiments that are in accordance with the disclosure include objects that store field values in a hash chain. The hash chain stores updates to the fields in a single chain of blocks that include one value for one field that is updated. Accessing the current state of the object is done using object field block identifiers that identify the blocks with the current values of the fields. The object field block identifiers are updated with every change to the state of the object so that the state of the object may be immediately retrieved by using the object field block identifiers.

In general, embodiments that are in accordance with the disclosure include objects that store field values in multiple hash chains. The multiple hash chains include chains for each field (referred to herein as the field hash chains) and a hash chain that records the current state of the object (referred to herein as the history hash chain). The hash chains for the fields include blocks that store one value for one field. The hash chain for the current and historical states of the object may include blocks that store field block identifiers that identify the blocks in the field hash chains, which store the field values for the state of the object. The end block of the history hash chain includes field block identifiers that identify the blocks with the current values of the fields of the object and may consume less space than storing a copy of the field values in the history hash chain. The blocks prior to the end block of the hash chain may include a complete state of the object at a prior point in time.

FIG. 1A, FIG. 1B, FIG. 1C, and FIG. 1D show diagrams of the system (100) in accordance with one or more disclosed embodiments. The various elements of the system (100) may correspond to the computing system shown in FIG. 10A and FIG. 10B. In particular, the type, hardware, and computer readable medium for the various components of the system (100) is presented in reference to FIG. 10A and FIG. 10B. In one or more embodiments, one or more of the elements shown in FIGS. 1A, 1B, 1C, and 1D may be omitted, repeated, combined, and/or altered as shown from FIGS. 1A, 1B, 1C, and 1D. Accordingly, the scope of the present disclosure should not be considered limited to the specific arrangements shown in FIGS. 1A, 1B, 1C, and 1D.

Referring to FIG. 1A, the system (100) includes the computer system (102) and the set of devices (142). The set of devices (142) may interact with the object (108) of the computer system (102).

Figure 10A:
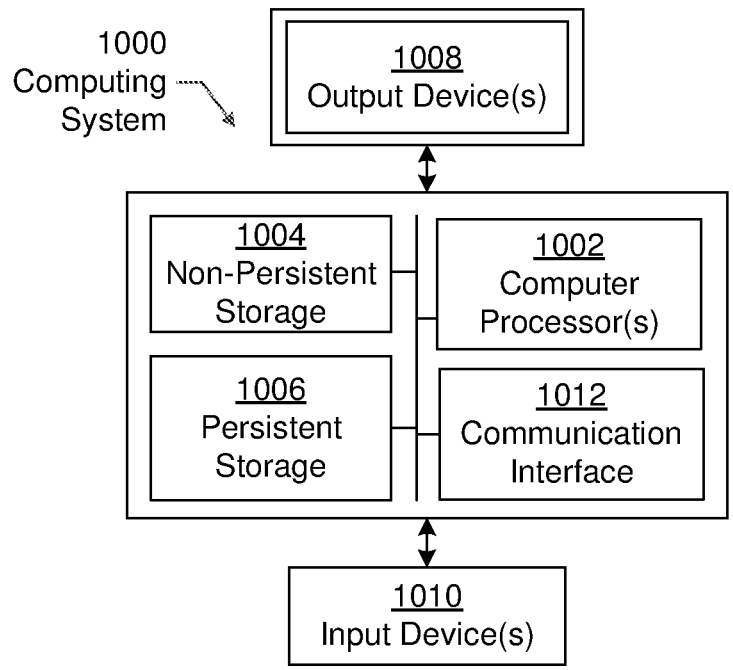
FIGS. 10A and 10B show computing systems in accordance with disclosed embodiments.
Figure 10B:
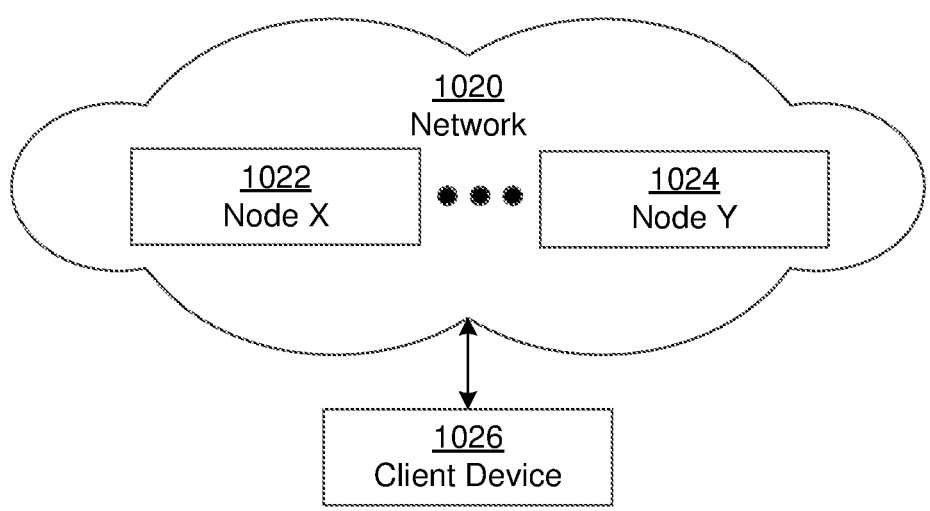

The computer system (102) is an embodiment of the computing system (1000 in FIG. 10A) and nodes (1022, 1024 in FIG. 10B) described in FIGS. 10A and 10B, respectively. Returning to FIG. 1, the computer system (102) is a physical computing device with the computer processor (104) and the memory (106). The computer processor (104) executes the functions (114) of the object (108), which is stored in the memory (106).

The object (108) is a programming object resident within the memory (106) formed from a combination of variables, functions, and data structures. The object (108) includes one or more fields (110), functions (114), hash chains (118), end block identifiers (130), and object field block identifiers (138). The object (108) may be of an object of a program written in an oriented programming language or may be a program written in a non-object oriented programming language. The object (108) may be written in any number of programming languages including Java, JavaScript, ANSI C, C++, Python, Perl, PHP, etc.

The fields (110) are the variables of the object (108) that identify the state of the object (108). The fields (110) have names and values that are stored within the hash chains (118) as the field data sets (126). A field may be of any type including: floating-point numbers, integers, characters, strings, other objects, etc. In one or more embodiments, the field (112) corresponds to the field data set (128) in the block (124) of the hash chain (120).

The functions (114) are sequences of program instructions that perform specific tasks for the object (108). The functions (114) include accessor functions that may read from and write to the fields (110) of the object (108) and may include functions to update the state of the object (108) by manipulating the values of the fields (110). The functions (114) include the function (116), which is an accessor function for the field (112) in one or more embodiments.

In one or more embodiments, the hash chains (118) include the hash chain (119) and the hash chain (120). The hash chains (118) record the values of the fields (110) of the object. The values of the fields (110) are recorded in the blocks (122) using a cryptographic hash function so that the historical values cannot be changed without detection. Suitable cryptographic hash algorithms for the cryptographic hash function used to store the values include Message Digest 5 (MD5), Secure Hash Algorithm (SHA), SHA-1, SHA-2, SHA-3, RACE Integrity Primitives Evaluation Message Digest (RIPEMD-160), Whirlpool, BLAKE, BLAKE2, etc.

In one or more embodiments, the blocks (122) include the present and historical values of the fields (110). The sequence of the blocks (122) is immutable so that any change to the order of the blocks (122) or the values within the blocks (152) is detectable by recalculating and verifying the hash values generated for each of the blocks (122). In one or more embodiments, the blocks (122) include the block (123) and the block (124).

The block (124) is one of the blocks (122). The block (124) includes field data sets (126) and chain data sets (130), which are further described below in FIG. 1B and FIG. 1C. In one or more embodiments, the blocks (122) include summary blocks. A summary block includes values or identifiers for each of the fields (110) to record the state of the object (108) in the summary block.

The end block identifiers (134) identify the end blocks of the hash chains (118). An end block of a hash chain is the most recently added block to the hash chain and is the block to which the next block of the hash chain is appended, which will become the next end block. In one or more embodiments, the end block identifier (136) identifies the block (124) as the end block of the hash chain (120).

The object field block identifiers (138) identify blocks (122) within the hash chains (118). In one or more embodiments, the current state of the object (108) is identified with the object field block identifiers (138), which identify a set of blocks of the hash chains (118) that contain the current values for the fields (110). In one or more embodiments, the object field block identifier (140) of the object field block identifiers (138) identify the block (124) as containing the current value for the field (112).

In one or more embodiments, the devices (142) include the device (144) and are used to access the object (108). In one or more embodiments, the device (144) is a computing system that executes one or more of programs on a physical computing device with processors (146) and memory (148), such as the computing system (1000) and nodes (1022, 1024) described in FIGS. 10A and 10B. The devices (142) are described further below in FIG. 1D.

Figure 1B:
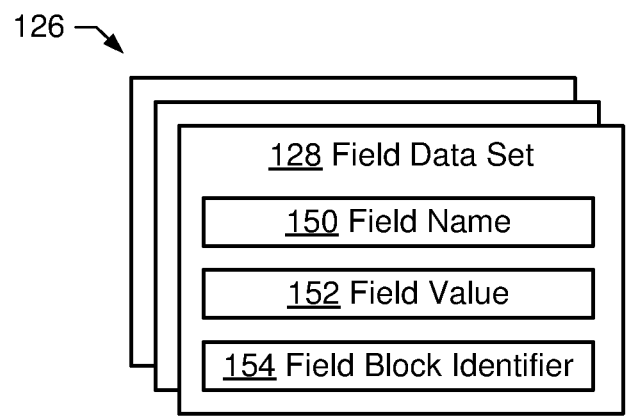

Referring to FIG. 1B, the field data sets (126) include the field data set (128) in accordance with one or more embodiments. The field data sets (126) store the values of the fields (110) of the object (108). In one or more embodiments, the field data set (128) stores the value for the field (112) of FIG. 1A. The field data set (128) includes the field name (150), the field value (152), and the field block identifier (154).

The field name (150) identifies one of the fields (110) that is related to the field data set (128). In one or more embodiments, the field name (150) identifies the name of the field (112).

In one or more embodiments, the field value (152) stores the value of a field of the object (108). The field value (152) may be any data type including an integer, a floating point value, a character, string, another object, a serialized version of another object, etc. In one or more embodiments, the field value (152) is the value for the field (112) of FIG. 1A, which is identified by the field name (150).

In one or more embodiments, the field block identifier (154) identifies a block with a value for a field of the object. In one or more embodiments, instead of storing the value of the field in a block, the field block identifier (154) identifies another block in one of the hash chains (118) that includes the value of the field. For example, instead of storing the value of the field in the field value (152), the field block identifier (154) may be used to identify a different block that includes the field value and the field name. The field block identifier (154) may be used in a summary block to reduce the amount of memory required for the summary block, such as when the field is another object, which may be large and complex.

Figure 1C:
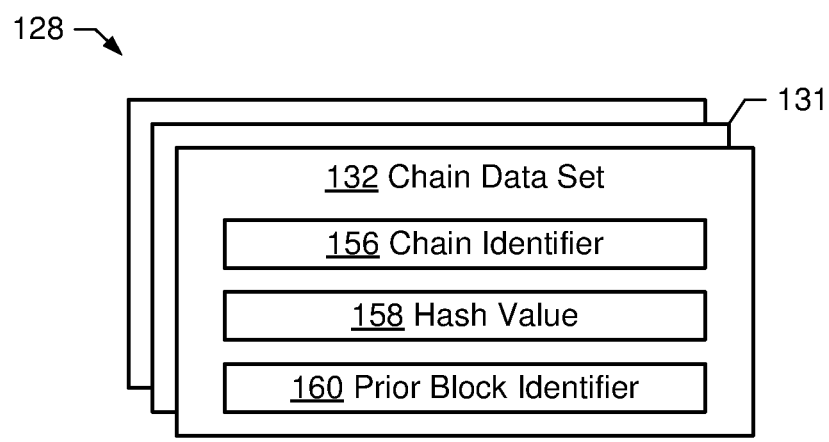

Referring to FIG. 1C, the chain data sets (128) include the chain data set (131) and the chain data set (132) in accordance with one or more embodiments. The chain data sets (128) store hash chain information for the block (124) that relates the block (124) to one or more of the hash chains (118) of the object (108). The block (124) may include chain data sets (128) that identify the hash chains (118) to which the block (124) belongs. As an example, the chain data set (132) links the block (124) to the hash chain (120) and the chain data set (131) links the block (124) to the hash chain (119). The chain data set includes the chain identifier (156), the hash value (158), and the prior block identifier (160).

In one or more embodiments, the chain identifier (156) identifies one of the hash chains (118) to which the block (124) belongs. In one or more embodiments, the chain identifier (156) identifies that the block (124) belongs to the hash chain (120).

In one or more embodiments, the hash value (158) is a cryptographic hash value generated for the block (124). In one or more embodiments, the hash value (158) is generated by applying a cryptographic hash algorithm to the field data sets (126) for the block (124) and the hash value of the prior block in the hash chain identified with the chain identifier (156). As an example, when the block (124) includes a single field with the value stored in the field data set, then the field value and the hash value of the prior block are combined by appending the hash value to the field value to form a message. The cryptographic hash algorithm is then applied to the message. When the block (124) includes multiple field values, the multiple field values are combined with the prior block hash value, such as by appending the multiple field use together and then appending the prior block hash value to form the message that is then hashed with the cryptographic hash algorithm. When the block (124) includes field block identifiers, the field values may be retrieved using the field block identifiers to form the message or the field block identifiers may be used in place of the field values to form the message. The message used to generate the hash value (158) includes one or more field values and field block identifiers and includes the prior block hash value. The message is hashed with a cryptographic hash algorithm to form the hash value (158).

The prior block identifier (160) identifies a prior block in the hash chain of the block (124). In one or more embodiments, the prior block identifier may be the hash value of the prior block. In one or more embodiments, the prior block identifier (160) identifies the block (123) from FIG. 1A as the block that is immediately preceding the block (124) in the hash chain (120).

Figure 1D:
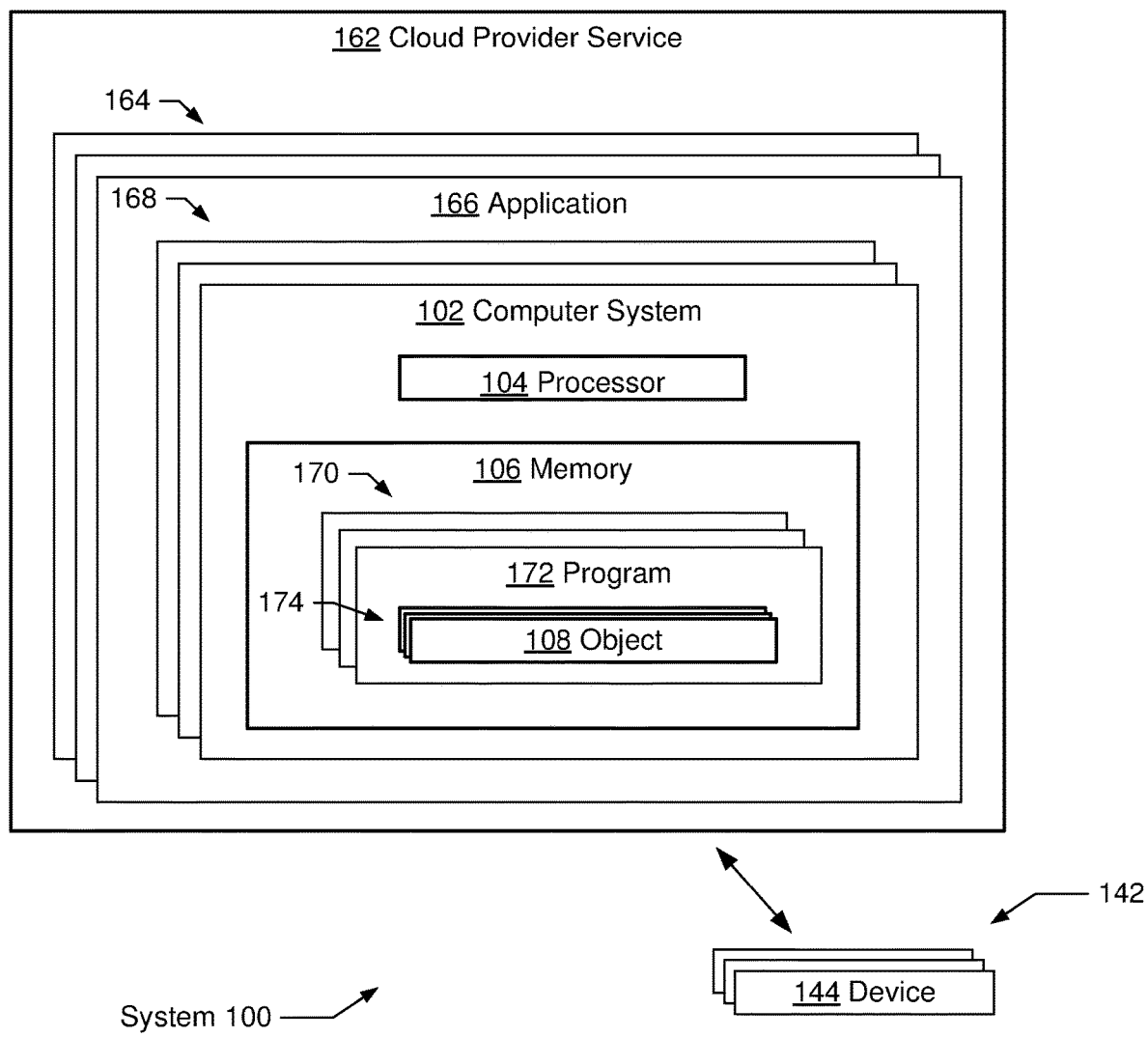

Referring to FIG. 1D, an example is shown where the cloud provider service (162) hosts the application (166), which includes the program (172), which includes the object (108). The cloud provider service (162) provides the information technology infrastructure for deploying distributed applications and web services, including the applications (164).

In one or more embodiments, the applications (164) include the application (166). In one or more embodiments, the application (166) is a distributed application that operates on the computer systems (168). As an example, the application (166) may be a web service, such as a website, and may be accessible to the devices (142) through a representational state transfer (RESTful) application programming interface (API).

The computer systems (168) include the computer system (102). In one or more embodiments, the computer systems (168) include the programming instructions and data for executing the application (166).

The computer system (102) includes the computer processor (104) and the memory (106), as described in FIG. 1A. The memory (106) includes the programs (170).

The programs (170) execute a part of the application (166) on the computer system (102). The programs (170) may be written in any number of programming languages including Java, JavaScript, ANSI C, C++, Python, Perl, PHP, etc. The programs (170) include the program (172), which includes the objects (174), which include the object (108). Programs written in languages that are not object oriented may still be treated as programming objects, such as by using shell commands and scripts to interface the programs.

In one or more embodiments, the objects (174) form the program (172), which executes a part of the application (166). The objects (174) include the object (108), which is further described with respect to FIG. 1A.

The devices (142) include the device (144), which may interact with the application (166). As an example, when the application (166) is a website, the device (144) may use a web browser to access the website provided by the application (166), which uses the object (108).

Figure 2:
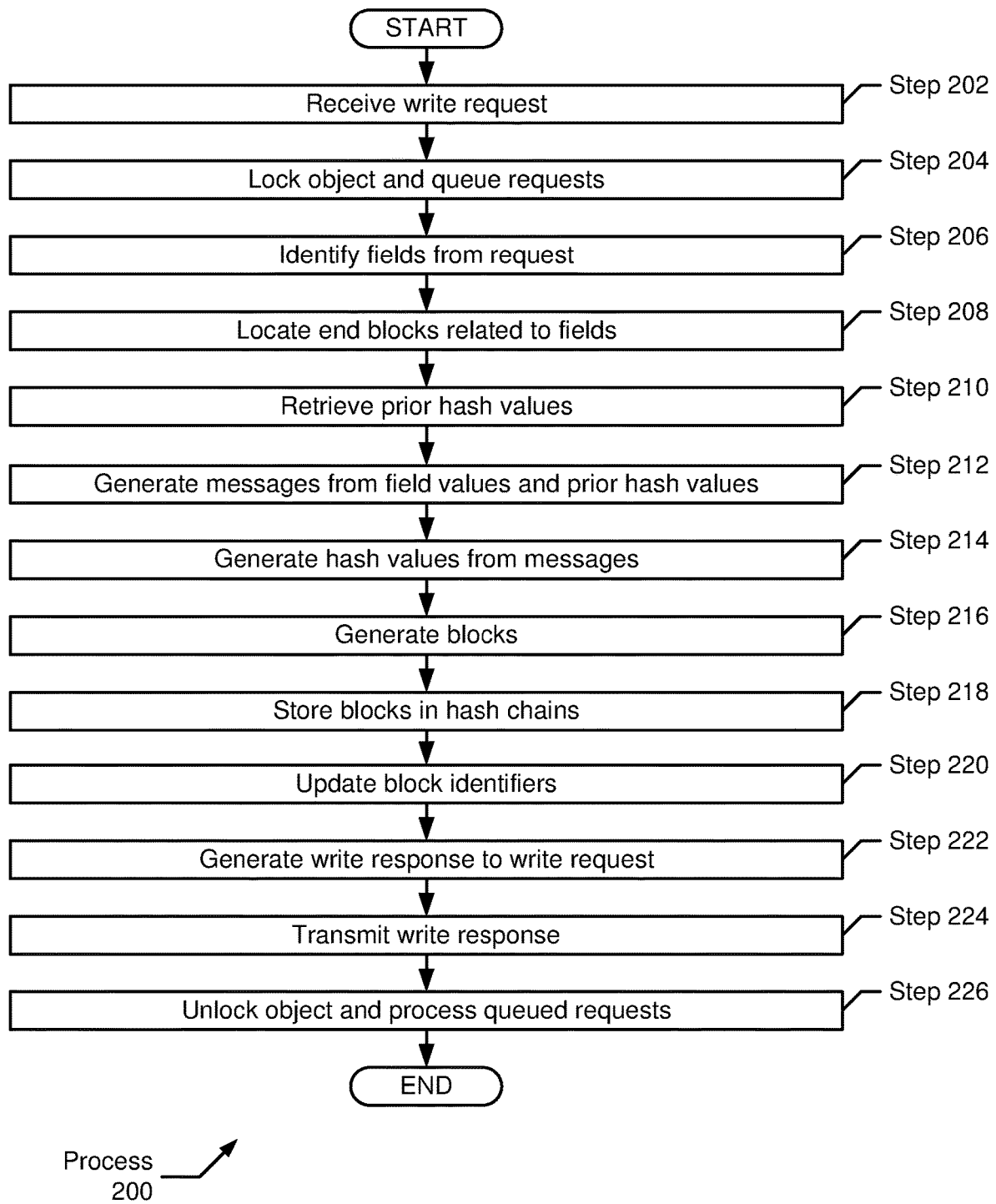
FIG. 2 and FIG. 3 show methods in accordance with one or more embodiments of the present disclosure.

FIG. 2 shows a flowchart in accordance with one or more embodiments of the disclosure. The flowchart of FIG. 2 depicts a process (200) that writes object field values and states to hash chains. The process (200) may be implemented on one or more components of the system (100) of FIG. 1. In one or more embodiments, one or more of the steps shown in FIG. 2 may be omitted, repeated, combined, and/or performed in a different order than the order shown in FIG. 2. Accordingly, the scope of the present disclosure should not be considered limited to the specific arrangement of steps shown in FIG. 2.

In Step 202, a write request is received. In one or more embodiments, the write request identifies the name of one or more fields of an object along with the field values to be written to the object. The write request may be received as part of a RESTful API call or as a function call from another object in the system. The fields specified in the write request may be of any type and may include other objects, serialized versions of other objects, references to other data or objects, and actual data values. Based on the write request, one or more blocks may be added to one or more hash chains. Even if only a single field is updated by a write request, multiple hash chains may be updated with one or more new blocks. For example, the object may include a history hash chain that records a chronologically ordered history of field updates along with additional hash chains for each field of the object.

In Step 204, the object is locked and requests are queued. The object is locked to prevent other requests from operating on incorrect data in the fields of the object. In one or more embodiments, the other requests are subsequent requests that are received after write request. The other requests are locked out from operating on the object and are queued to be executed after the current write request has completed. The other requests may include other read requests and other write requests. In one or more embodiments, the other requests are queued in chronological order. In one or more embodiments, the object is locked by setting a lock flag that identifies whether the object is locked and whether to queue additional requests.

In Step 206, fields are identified from the request. In one or more embodiments, the write request may specify one or multiple fields that are to be updated with new field values. The fields are specified in the write request with the field names for the field to be updated in the object.

In Step 208, end blocks related to the fields are located. In one or more embodiments, the end blocks of the hash chains related to the fields are located by resolving the association between the end block identifiers for the hash chains and the fields names specified in the write request. In one or more embodiments, the association is resolved by looking up a mapping between the field specified by a field name and an end block identifier for the hash chain for the field.

In Step 210, prior hash values are retrieved. In one or more embodiments, after identifying the end blocks, the immediately prior blocks to the end blocks are identified from prior block identifiers within chain data sets of the end blocks. After identifying the prior blocks, the hash values from the chain data the prior blocks are retrieved.

In Step 212, messages are generated from field values and prior hash values. The messages are the inputs to a cryptographic hash function. The messages are generated by combining field values for the new blocks with the hash values from the prior blocks. One or more of the field names, field values, and field block identifiers may be appended together with the hash value from a prior block to form a message, which may be in a binary or serialized format. The example below shows the message formed as a JSON formatted string from the field information provided in the write request and the hash value of a prior block.
{"Name":"John Maximus",
"Age":"21",
"Prior Hash Value":
"B5AEAF478D38352B401DE55B240CB5F245189A69"}
The field information identifies that the value of "John Maximus" is to be written to the field "Name" and the value of "21" is to be written to the field "Age". The hash value of
"B5AEAF478D38352B401DE55B240CB5F245189A69"
from the prior block is also included in the message and was generated using the SHA-1 algorithm for this example.

In Step 214, hash values are generated from messages. For each message generated using field data set information from the write request, a hash value is generated using a cryptographic hash function. Continuing the example from above, the SHA-1 algorithm is used to generate the hash value shown below from the example message from Step 212.
SHA-1 hash value:
54F15577E4C6CAC4ACC8AD273F4563FB9AAF08E0

A block may be part of multiple hash chains and hash values may be generated for one or more hash chains that a block is a part of. For example, a single message may be created that includes the hash values from the prior blocks of two different hash chains, as shown below.
{"Name":"John Maximus",
"History Chain Prior Hash Value":
"493C91971B82C6474817246F8632FED423C4861F1",
"Field Chain Prior Hash Value":
"8B98FE2B8ACA934B2998BEBD2885905445A28928"}
From the message above the single hash value below is generated.
SHA-1 hash value:
4F0979C3CDBA78D502A29583B05C6D31EB831B74

The single hash value above may be used in a single block that is part of two different hash chains, the "History Chain" and the "Field Chain". The single hash value may be used in the chain data information for both hash chains that will receive the new block.

Alternatively, two different messages may be generated with one message for each hash chain, as shown below.
{"Name":"John Maximus",
"History Chain Prior Hash Value":
"493C91971B82C6474817246F8632FED423C4861F1"}
{"Name":"John Maximus",
"Field Chain Prior Hash Value":
"8B98FE2B8ACA934B2998BEBD2885905445A28928"}
Processing the messages above with the SHA-1 algorithm yields the hash values below.
SHA-1 History Chain hash value:
29F2198B523EF0DBA298407C2133F825065EC122
SHA-1 Field Chain hash value:
536A20F1EE09AFB3198F8C10C4E5B5590FEC3813
The two hash values above may be used in two different new blocks for the two different chains.

In Step 216, blocks are generated. In one or more embodiments, the blocks are generated by collecting all of the information for the field data sets and chain data sets into the blocks. For example, a write request that updates two fields may include two field data sets, one for each updated field, and one or more chain data sets. The chain data sets include the hash chain identifiers, hash values, and prior block identifiers that are needed to integrate the blocks into the hash chains. One or more of the field data sets in a block may include field block identifiers instead of field values, which may reduce the size of the block when the field values are large objects.

In one or more embodiments, when a block is generated that is a summary block, information for field data sets for all of the fields of the object may be included in the summary block. A summary block, or any other block, may include a mixture of field values and field block identifiers for the field data sets.

In Step 218, blocks are stored in the hash chains. In one or more embodiments, the blocks are stored in the hash chains by updating the end block identifiers to identify the newly generated blocks.

In Step 220, block identifiers are updated. In one or more embodiments that include object field block identifiers in the object, the object field block identifiers are updated to identify the correct blocks in the hash chains. For example, an object may include a set of object field block identifiers that identify the blocks in the hash chains that have the current field values for the fields of the object. Using the object field block identifiers reduces the amount of time needed to determine the current state of the object and the current values of the fields, as compared to determining the current state of the object and values of the fields by looking the field values by traversing multiple blocks of the hash chains.

In Step 222, a write response is generated for the write request. In one or more embodiments, the write response identifies whether the fields identified in the write request were successfully updated. The write response may include acknowledgements for the fields were updated and may include the updated end block identifiers of the hash chains of the object.

In Step 224, the write response is transmitted. In one or more embodiments, the write response is transmitted from the computer system hosting the object to the device and/or object that sent the write request.

In Step 226, the object is unlocked and the queued requests are processed. After updating the fields and hash chains of the object, subsequent requests that were received after the object was locked may be processed using the information from the write request that was written to and stored in the hash chains of the object.

Figure 3:
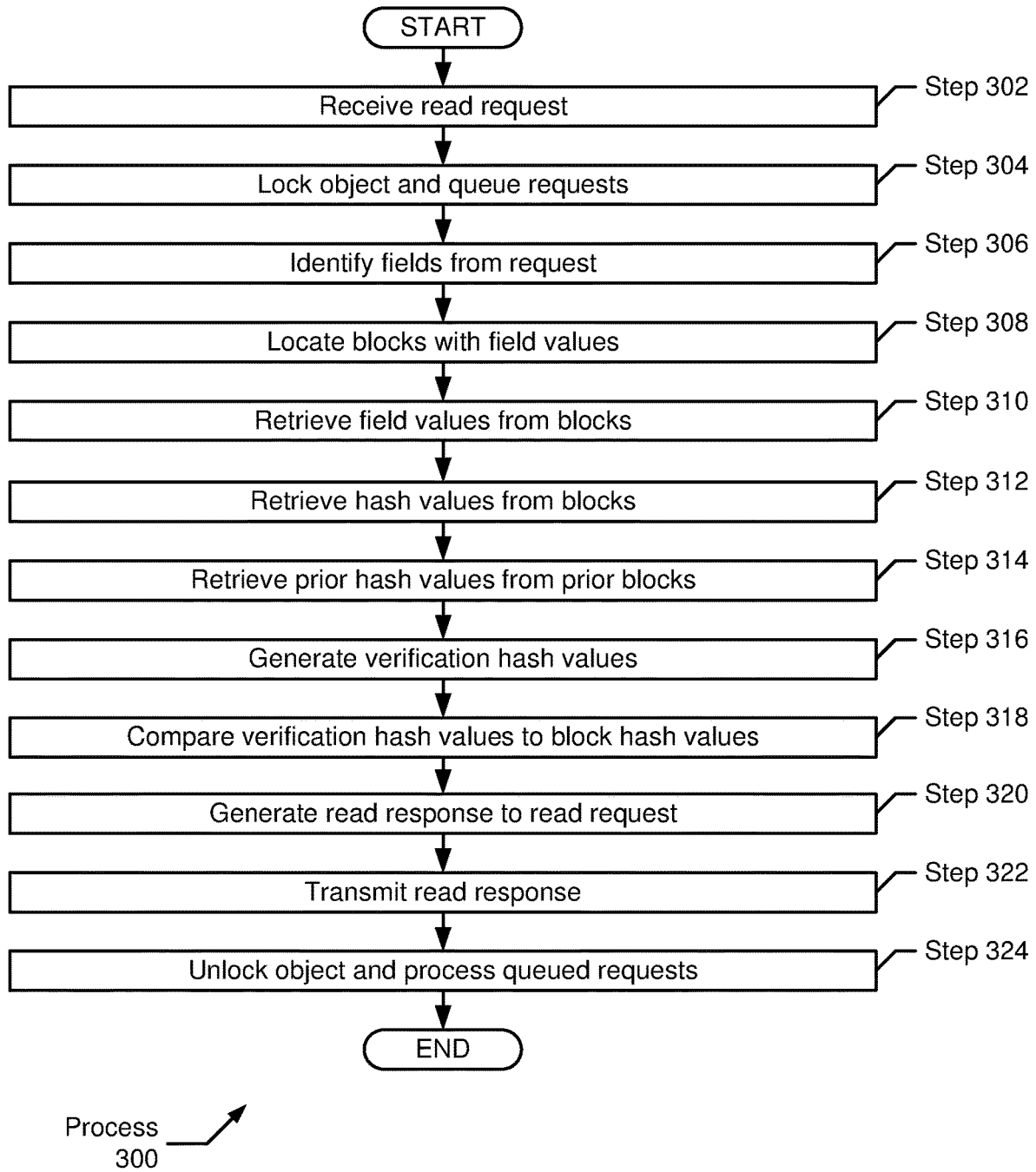

FIG. 3 shows a flowchart in accordance with one or more embodiments of the disclosure. FIG. 3 depicts a process (300) that reads object field values and states from hash chains. The process (300) may be implemented on one or more components of the system (100) of FIG. 1. In one or more embodiments, one or more of the steps shown in FIG. 3 may be omitted, repeated, combined, and/or performed in a different order than the order shown in FIG. 3. Accordingly, the scope of the present disclosure should not be considered limited to the specific arrangement of steps shown in FIG. 3.

In Step 302, a read request is received. In one or more embodiments, the read request identifies the name of one or more fields of an object to be read from the object. The read request may be received as part of a RESTful API call or as a function call from another object in the system. The fields specified in the read request may be of any type and may include other objects, serialized versions of other objects, references to other data or objects, and actual data values. Based on the read request, one or more blocks may be added to one or more hash chains.

In one or more embodiments, the read request may specify whether the values to be retrieved from the object are verified. The verification may be with respect to the current and immediately prior blocks that store the field values resulting in a partial verification of the hash chains. Additional embodiments may verify the integrity and validity of the entire hash chain by verifying every hash value in every block of every chain to form a full verification of the hash chains of the object.

Even if only a single field is accessed by a read request, multiple hash chains may be fully or partially verified. For example, the object may include a history hash chain that records a chronologically ordered history of field updates along with additional hash chains for each field of the object. A partial verification may verify the blocks of each chain that includes the field value being accessed. Full verification may be performed on one or more chains that include the field value being accessed.

In one or more embodiments, the read request may specify historical values to be retrieved for the fields to be access. For example, the read request may include and ordinal value that identifies which historical value is to be retrieved. The order of value may be based on the first value written to the chain (e.g., "2" would specify the second value written to the chain for the field) or based on the last value written to the chain (e.g., "3" would specify the third to last value written to the chain for the field). In one or more embodiments, the read function of the object may handle both the first value basis and the last value basis and an additional code is provided in the read request to identify which basis is being used. The additional code may be in the form of an additional variable that specifies the basis. In one or more embodiments, the additional code may be specified using signed ordinal numbers (integers) so that negative numbers may specify one basis (based on first or last block) and positive numbers may specify the other basis (based on last or first block).

In step 304, the object is locked and requests are queued. The object is locked to prevent other requests from changing the data in the fields and blocks of the object during the processing of the read request. In one or more embodiments, the other requests are subsequent requests that are received after read request. The other requests are locked out from operating on the object and are queued to be executed after the current read request has completed. The other requests may include other read requests and other write requests. In one or more embodiments, write requests are queued while other read requests that do not change the data in the object are processed in addition to the current read request. In one or more embodiments, the other requests are queued in chronological order. In one or more embodiments, the object is locked by setting a lock flag that identifies whether the object is locked for additional write requests, whether the object is locked for additional read requests, and whether to queue additional requests.

In Step 306, fields are identified from the request. In one or more embodiments, the read request may specify one or multiple fields whose values are to be read and returned. The fields are specified in the read request with the field names for the field to be accessed in the object.

In Step 308, blocks related to the fields are located. In one or more embodiments, the end blocks of the hash chains related to the fields are located by resolving the association between the end block identifiers for the hash chains and the fields with the field names from the read request (also referred to as received field names). In one or more embodiments, the association is resolved by looking up a mapping between the field specified with the received field name and an end block identifier for the hash chain for the field. When the read request includes ordinal values that identify historical field values that are not the current field values are to be retrieved, the chains are traversed from the end blocks to find the historical field values that correspond to the ordinal values from the read request.

In Step 310, field values are retrieved from blocks. In one or more embodiments, after identifying the blocks that include the field values specified in the read request, the blocks are accessed to retrieve the field values. When the field value is stored in the block, the field value may be retrieved directly from the block. When the block stores a field block identifier instead of a field value, the field block identifier is resolved to identify a subsequent block that includes the field value and the field value is retrieved from the subsequent block.

In Step 312, hash values are retrieved from blocks. When the read request includes an indication that the field values are to be verified, the hash values are retrieved from the blocks used to retrieve the field values responsive to the read request to form a set of block hash values. For example, when the read request indicates that the current values for a set of fields are to be accessed, then the hash values are retrieved from the blocks that identify the current values for the set of fields. In one or more embodiments where a block includes an identifier instead of the actual value, the hash value of the block with the identifier and the hash value of the subsequent block with the actual field value may be retrieved to be verified.

In Step 314, prior hash values from prior blocks are retrieved. In one or more embodiments, after retrieving the hash values for the blocks that identify the field values that are responsive to the read request (the set of block hash values), the immediately prior blocks may be identified and the hash values from the immediately prior blocks are retrieved as a set of prior hash values.

In Step 316, verification hash values are generated. In one or more embodiments, the messages used to generate the block hash values in the set of block hash values for the blocks that identify the field values that are responsive to the read request are recreated from the field data sets stored in the blocks and the prior hash values. After recreating the messages, verification hash values are generated by applying the same cryptographic hash function to the messages.

In Step 318, verification hash values are compared to block hash values. In one or more embodiments the verification hash values are compared to corresponding block hash values generated from the same field data sets and prior hash values. When the verification hash value matches the block hash value, then the field value is verified and the integrity of the hash chains and the object are confirmed. When the hash value does not match the block hash value and is a mismatch, then the field value is not verified and the integrity of the hash chains and of the object are not confirmed.

In Step 320, a read response to the read request is generated. In one or more embodiments, the read response includes the field values that are responsive to the read request. In one or more embodiments that requested verification, the read response includes the confirmation of whether the field values, hash chains, and object passed the verification test. When the verification did not pass and there is no confirmation, the read response may include a warning or error message that indicates that the integrity of the field values, hash chains, and object may have been compromised.

In Step 322, the read response is transmitted. In one or more embodiments, the read response is transmitted from the computer system hosting the object to the device and/or object that sent the read request.

In Step 324, the object is unlocked and the queued requests are processed. After accessing and retrieving the field values from the object, subsequent requests that were received after the object was locked may be processed.

FIGS. 4, 5, 6, 7, 8 and 9 show examples of hash chains that may be included by objects. An object may include one or more of the hash chains from the hash chains shown in FIGS. 4 through 9.

Referring to FIG. 4, the hash chain (400) includes the blocks (402-414) with the data members (416-472) and includes summary blocks at predefined intervals. The hash chain (400) is presented in a tabular form with rows and columns that may be presented using one or more components of the system (100) of FIG. 1. For example, the devices (142) of FIG. 1 may show one or more of the depicted rows and columns to a user. In one or more embodiments, the hash chain is not stored in a tabular data structure even though it is presented as a table. In one or more embodiments, one or more of the blocks and data members shown in FIG. 4 may be omitted, repeated, combined, and/or presented in a different order than the order shown in FIG. 4. Accordingly, the scope of the present disclosure should not be considered limited to the specific arrangement of blocks and data members shown in FIG. 4. The hash chain (400) is referred to as "Chain 1" within the data members (416-472) in FIG. 4.

The block (402) is the genesis block of the hash chain (400) that includes a chain data set. The data members (416, 418, 420) form the chain data set of the block (402) and include the chain identifier (416), the hash value (418), and the prior block identifier (420). The prior block identifier (420) identifies itself as the prior block of the hash chain. The block (402) does not include any field data sets.

The block (404) is a first block in the hash chain (400). In addition to a chain data set that includes the data members (422-426), the block (404) includes the field data set (428). In one or more embodiments, field data set (428) includes a field name and a field value for a first field of the object that contains the hash chain (400). The prior block identifier (426) identifies the genesis block (402) as the prior block.

The block (406) is a second block in the hash chain (400). The field data set (436) updates the value of a second field the object.

The block (408) is a third block in the hash chain (400). The block (408) is a summary block and has an ordinal value that is evenly divisible by a predefined number (e.g., "3"). In addition to including a field data set (444) for the third field of the object, the block (408) includes additional field data sets (446, 448) that copy forward the previously recorded field data sets. The data field set (428) of the block (404) for the first field of the object is copied forward to the field data set (446) of the block (408). The data field set (436) of the block (406) for the second field of the object is copied forward to the field data set (448) of the block (408). When the block (408) was written to the hash chain (400), three fields were defined and had values so that the three field data sets (444, 446, 448) are included in the block (408). In one or more embodiments, undefined fields are not included in a summary block.

The block (410) includes an update to the second field of the object stored in the field data set (452). The block (412) includes an update to the third field of the object stored in the field data set (460). The block (414) is another summary block with an ordinal value that is evenly divisible by the predefined number (e.g., "3"). The block (414) includes the field data sets (468, 470, 472) for the three fields of the object. The field data set (468) is the latest value for the third field of the object. The field data set (470) for the first field is copied forward from the field data set (446) from the summary block (408). The field data set (472) for the second field is copied forward from the field data set (452) from the block (410).

The object associated with the hash chain (400) includes three fields. The fields of the object are stored and accessed using the information in the hash chain (400). Field values may be retrieved from the field data sets in the blocks of the hash chains. New values may be written to the fields by appending new blocks to the hash chains (500, 520, 550).

After the object was initialized, the first field was updated with the value in the field data set (428) in the block (404). The second field was then updated with the value in the field data set (436). The third field was then updated with the value in the field data set (444) and the values for the first two fields of the object were copied into the field data set (446) and the field data set (448) to form a summary block. The second field was then updated with the block (410). A first update to the third field occurred with the block (412) and a second update to the third field occurred with the block (414), which is another summary block that includes field data sets for each of the fields of the object.

Referring to FIG. 5, the hash chains (500, 520, 550) include the blocks (502-504, 522-526, 552-558) with the data members (506-518, 528-548, 560-588). The hash chains (500, 520, 550) are presented in a tabular form with rows and columns that may be presented using one or more components of the system (100) of FIG. 1. For example, the devices (142) of FIG. 1 may show one or more of the depicted rows and columns to a user. In one or more embodiments, the hash chains are not stored in a tabular data structure even though it may be presented as a table. In one or more embodiments, one or more of the blocks and data members shown in FIG. 5 may be omitted, repeated, combined, and/or presented in a different order than the order shown in FIG. 5. Accordingly, the scope of the present disclosure should not be considered limited to the specific arrangement of chains, blocks, and data members shown in FIG. 5. The hash chains (500, 520, 550) are respectively referred to as "Chain 2", "Chain 3", and "Chain 4" within the data members (506-518, 528-548, 560-588) in FIG. 5.

The object associated with the hash chains (500, 520, 550) includes three fields that correspond to the three hash chains (500, 520, 550), which may be referred to as field hash chains. The fields of the object are accessed using the information in the hash chains (500, 520, 550). Field values may be retrieved from the field data sets in the blocks of the hash chains (500, 520, 550). New values may be written to the fields by appending new blocks to the hash chains (500, 520, 550). The hash chains (500, 520, 550) do not include summary blocks.

The blocks (502, 522, 552) form genesis blocks of their respective hash chains (500, 520, 550). The blocks (502, 522, 552) do not include field data sets and do not store values for the fields of the object.

The first field of the object is recorded in the hash chain (500). The first field is updated one time with the value recorded in the block (504).

The second field of the object is recorded in the hash chain (520). The second field is updated two times with the value first recorded in the block (524) and then updated in the block (520).

The third field of the object is recorded in the hash chain (550). The third field is updated three times with the value first recorded in the block (554), updated in the block (556), and updated in the block (558).

Referring to FIG. 6, an object includes the hash chain (600) and the set of object field block identifiers (670). The hash chain (600) is presented in a tabular form with rows and columns that may be presented using one or more components of the system (100) of FIG. 1. For example, the devices (142) of FIG. 1 may show one or more of the depicted rows and columns to a user. In one or more embodiments, the hash chain is not stored in a tabular data structure even though it is presented as a table. In one or more embodiments, one or more of the blocks and data members shown in FIG. 6 may be omitted, repeated, combined, and/or presented in a different order than the order shown in FIG. 6. Accordingly, the scope of the present disclosure should not be considered limited to the specific arrangement of blocks and data members shown in FIG. 6.

The hash chain (600) includes the blocks (602-614) with the data members (616-668). The hash chain (600) is referred to as "Chain 5" within the data members (616-668) in FIG. 6.

The object associated with the hash chain (600) includes three fields that are stored in the hash chain (600). The object maintains the set of object field block identifiers (670) for the fields. The object field block identifiers (672-676) identify the blocks with the current values of the fields of the object. The object field block identifier (672) indicates that the block (604) (referred to as "Chain 5:Block 1" in FIG. 6) includes the current value of the first field, which is stored in the data field set (628). The object field block identifier (674) indicates that the block (610) (referred to as "Chain 5:Block 4" in FIG. 6) includes the current value of the second field, which is stored in the data field set (652). The object field block identifier (676) indicates that the block (614) (referred to as "Chain 5:Block 6" in FIG. 6) includes the current value of the field, which is stored in the data field set (668). The fields of the object are accessed using the information in the hash chain (600). Field values may be retrieved from the field data sets in the blocks of the hash chain (600). New values may be written to the fields by appending new blocks to the hash chain (600) and updating the object field block identifiers (672-676). The hash chain (600) does not include summary blocks.

The object field block identifiers are updated as the field values are written to the hash chain (600) using the accessor functions of the object. For example, When the block (614) is added to the hash chain (600), the object field block identifier (676) for the third field of the object is updated from identifying the block (612) to identifying the block (614) as containing the current value of the third field of the object. The first and second fields are not updated and the first and second object field block identifiers (672 and 674) continue to identify the blocks (604 and 610) as having the current values of the first and second fields. Having the set of object field block identifiers (670) allows an accessor function to immediately access the current value of each field, without having to traverse the hash chain (600) from the end block (614) to locate field values that were added to the hash chain (600) before the end block (614) was added and without the use of summary blocks.

Referring to FIG. 7, the hash chain (700) includes the blocks (702-714) with the data members (716-786). The hash chain (700) is presented in a tabular form with rows and columns that may be presented using one or more components of the system (100) of FIG. 1. For example, the devices (142) of FIG. 1 may show one or more of the depicted rows and columns to a user. In one or more embodiments, the hash chain is not stored in a tabular data structure even though it is presented as a table. In one or more embodiments, one or more of the blocks and data members shown in FIG. 7 may be omitted, repeated, combined, and/or presented in a different order than the order shown in FIG. 7. Accordingly, the scope of the present disclosure should not be considered limited to the specific arrangement of blocks and data members shown in FIG. 7. The hash chain (700) is referred to as "Chain 6" within the data members (716-786) in FIG. 7. The hash chains (500, 520, 550) of FIG. 5 are respectively referred to as "Chain 2", "Chain 3", and "Chain 4" within the data members (716-786) in FIG. 7.

The object associated with the hash chain (700) includes three fields and the values of the fields are stored in the field data sets of the hash chains (500, 520, 550) shown in FIG. 5. The field data sets stored in the chain 700 include the field block identifiers (728, 736-738, 746-750, 758-762, 770-774, 782-786) that identify the blocks in the hash chains (500, 520, 550) of FIG. 5 that store the values for the fields of the object. For example, the block 714 includes the field block identifiers (782, 784, 786). The field block identifier (782) identifies "Chain 2:Block 1", which is the block 504 of the chain 500 of FIG. 5. The field block identifier (784) identifies "Chain 3:Block 2", which is the block 526 of the chain 520 of FIG. 5. The field block identifier (786) identifies "Chain 4:Block 3", which is the block 558 of the chain 550 of FIG. 5. In one or more embodiments, the field data sets may also include the field names in addition to the field block identifiers (728, 736-738, 746-750, 758-762, 770-774, 782-786).

In one or more embodiments, the object maintains a set of object field block identifiers for the fields. The object field block identifiers identify the blocks in the hash chain (700) that identify the blocks in the hash chains (500, 520, 550) of FIG. 5 that store the values of the fields of the objects. The hash chain (700) stores the chronological order of the updates to the hash chains (500, 520, 550) of FIG. 5.

Referring to FIG. 8, an object includes the hash chain (800), the set of end block identifiers (862), and the set of object field block identifiers (872). The hash chain (800) is presented in a tabular form with rows and columns that may be presented using one or more components of the system (100) of FIG. 1. For example, the devices (142) of FIG. 1 may show one or more of the depicted rows and columns to a user. In one or more embodiments, the hash chain is not stored in a tabular data structure even though it is presented as a table. In one or more embodiments, one or more of the blocks and data members shown in FIG. 8 may be omitted, repeated, combined, and/or presented in a different order than the order shown in FIG. 8. Accordingly, the scope of the present disclosure should not be considered limited to the specific arrangement of blocks and data members shown in FIG. 8.

The hash chain (800) includes the blocks (802-814) with the data members (816-860). The hash chain (800) includes four different hash chains that are referred to as "Chain 7" through "Chain 10" in FIG. 8. In one or more embodiments, the blocks of the hash chain (800) include multiple chain data sets. For example, the block (804) includes a first chain data set that includes the chain identifier (819), the hash value (820), and the prior block identifier (821). The block (804) also includes a second chain data set that includes the chain identifier (822), the hash value (823), and the prior block identifier (824). Additionally, the block (804) includes the field data set (825) that may include a name and value for the first field of the object.

The blocks (802-814) of the hash chain (800) are part of one or more chains within the hash chain (800). For example, the block (812) is a part of Chain 7 and a part of Chain 10 within the hash chain (800). The chain identifier (847) identifies the block (812) as being a part of Chain 7 and the chain identifier (850) identifies the block (812) as being a part of Chain 10. The hash value (848) is generated from the field value (853) and the prior hash value (841) from the block (810), which is identified as the prior block with the prior block identifier (849) (referring to the block (810) as "Chain 7:Block 4"). The hash value (851) is generated from the field value (853) and the prior hash value (837) from the block (808), which is identified as the prior block with the prior block identifier (852) (referring to the block (812) as "Chain 10:Block 1").

Chain 7 includes the genesis block (802), which is used as the genesis block for each of Chain 7 through Chain 10 within the hash chain (800). Chain 7 includes the blocks (802-814) and is identified with the chain identifiers (816, 819, 826, 833, 840, 847, 854) in the first chain data sets of the blocks (802-814). Chain 8 includes the block (804) and is identified with the chain identifier (822) in the second chain data set of the block (804). Chain 9 includes the blocks (806, 810) and is identified with the chain identifiers (829, 843) in the second chain data sets of the blocks (806, 810). Chain 10 includes the blocks (808, 812, 814) and is identified with the chain identifiers (836, 850, 857) in the second chain data sets of the blocks (808, 812, 814).

Chain 7 through Chain 10 have their own end blocks, which are identified with the end block identifiers (864-870) of the set of end block identifiers (862). The end block identifier (864) identifies the end block of Chain 7 as the block (814) (referenced as "Chain 7:Block 6"), which is the most recent block written to the hash chain (800). The end block identifier (866) identifies the end block of Chain 8 as the block (804) (referenced as "Chain 8:Block 1), which is the only block that includes a value for the first field of the object stored in the field data set (825). The end block identifier (868) identifies the end block of Chain 9 as the block (810) (referenced as "Chain 9:Block 2"), which is the block that includes the most recent update to the second field of the object stored in the field data set (846). The end block identifier (870) identifies the end block of Chain 10 as the block (814) (referenced as "Chain 10:Block 3"), which is the same as the end block for Chain 7 and includes the most recent update to the third field of the object stored in the field data set (860).

The set of object field block identifiers (872) includes the object field block identifiers (874, 876, 878). The object field block identifiers (874, 876, 878) identify the blocks that contain the current values of the fields of the objects with reference to the location of the blocks within Chain 7 to see the history when the current field values were added to the hash chain (800). The current value of the first field is identified with the object field block identifier (874) with the reference "Chain 7:Block 1" as being the first block added to Chain 7 in the hash chain (800). The current value of the second field is identified with the object field block identifier (876) with the reference "Chain 7:Block 4" as being the fourth block added to Chain 7 in the hash chain (800). The current value of the third field is identified with the object field block identifier (878) with the reference "Chain 7:Block 6" as being the sixth block added to Chain 7 in the hash chain (800).

The end block identifiers (864, 870) and the object field block identifier (878) identify the same block (814) of the hash chain (800). The end block identifier (864) and the object field block identifier (878) refer to the first chain of the block (814), which is identified as "Chain 7". The end block identifier (870) refers to the second chain of the block (814), which is identified as "Chain 10".

The end block identifier (866) and the object field block identifier (874) identify the same block (804) of the hash chain (800). The end block identifier (866) refers to the second chain of the block (804), which is identified as "Chain 8". The object field block identifier (876) refers to the first chain of the block (804), which is identified as "Chain 7".

The end block identifier (868) and the object field block identifier (876) identify the same block (810) of the hash chain (800). The end block identifier (868) refers to the second chain of the block (804), which is identified as "Chain 9". The object field block identifier (876) refers to the first chain of the block (804), which is identified as "Chain 7".

Referring to FIG. 9, the hash chain (900) includes the blocks (902-914) with the data members (916-969). The hash chain (900) is presented in a tabular form with rows and columns that may be presented using one or more components of the system (100) of FIG. 1. For example, the devices (142) of FIG. 1 may show one or more of the depicted rows and columns to a user. In one or more embodiments, the hash chain is not stored in a tabular data structure even though it is presented as a table. In one or more embodiments, one or more of the blocks and data members shown in FIG. 9 may be omitted, repeated, combined, and/or presented in a different order than the order shown in FIG. 9. Accordingly, the scope of the present disclosure should not be considered limited to the specific arrangement of blocks and data members shown in FIG. 9.

The hash chain (900) includes four different chains referred to as "Chain 11" through "Chain 14" and includes summary blocks that use field block identifiers. For example, the block (906) includes a first chain data set with the chain identifier (926), hash value (927), and prior block identifier (928) that refer to Chain 11. The block (906) includes a second chain data set that refers to Chain 13 with the chain identifier (929), the hash value (930), and the prior block identifier (931). The prior block identifier (931) refers to the common genesis block (902) that is the same for Chain 11 through Chain 14. The block (906) includes a first field data set (932) that may include the name and the value for the second field of the object. The block (906) includes a second field data set with the field block identifier (933) that identifies the block (904) (referred to as "Chain 12:Block 1" in FIG. 9) as having the most recent value for the first field of the object, which is stored in the first field data set (925) of the block (904). The block (906) does not include a field data set for the third field of the object because the third field of the object has not received an initial value.

The blocks (904-914) are summary blocks that include field data sets for the fields that have been initialized. The blocks (908-914) include field data sets for the three fields of the object after the fields of the object have been initialized. In one or more embodiments, the fields of the objects may alternatively be filled with default values so that the blocks (904, 906) may contain field data sets for every field of the object.

Embodiments may be implemented on a computing system. Any combination of mobile, desktop, server, router, switch, embedded device, or other types of hardware may be used. For example, as shown in FIG. 10A, the computing system (1000) may include one or more computer processors (1002), non-persistent storage (1004) (e.g., volatile memory, such as random access memory (RAM), cache memory), persistent storage (1006) (e.g., a hard disk, an optical drive such as a compact disk (CD) drive or digital versatile disk (DVD) drive, a flash memory, etc.), a communication interface (1012) (e.g., Bluetooth interface, infrared interface, network interface, optical interface, etc.), and numerous other elements and functionalities.

The computer processor(s) (1002) may be an integrated circuit for processing instructions. For example, the computer processor(s) may be one or more cores or micro-cores of a processor. The computing system (1000) may also include one or more input devices (1010), such as a touchscreen, keyboard, mouse, microphone, touchpad, electronic pen, or any other type of input device.

The communication interface (1012) may include an integrated circuit for connecting the computing system (1000) to a network (not shown) (e.g., a local area network (LAN), a wide area network (WAN) such as the Internet, mobile network, or any other type of network) and/or to another device, such as another computing device.

Further, the computing system (1000) may include one or more output devices (1008), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (1002), non-persistent storage (1004), and persistent storage (1006). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

The computing system (1000) in FIG. 10A may be connected to or be a part of a network. For example, as shown in FIG. 10B, the network (1020) may include multiple nodes (e.g., node X (1022), node Y (1024)). Nodes may correspond to a computing system, such as the computing system shown in FIG. 10A, or a group of nodes combined may correspond to the computing system shown in FIG. 10A. By way of an example, embodiments of the disclosure may be implemented on a node of a distributed system that is connected to other nodes. By way of another example, embodiments of the disclosure may be implemented on a distributed computing system having multiple nodes, where portions of the disclosure may be located on a different node within the distributed computing system. Further, one or more elements of the aforementioned computing system (1000) may be located at a remote location and connected to the other elements over a network.

Although not shown in FIG. 10B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (1022), node Y (1024)) in the network (1020) may be configured to provide services for a client device (1026). For example, the nodes may be part of a cloud computing system. The nodes may include functionality to receive requests from the client device (1026) and transmit responses to the client device (1026). The client device (1026) may be a computing system, such as the computing system shown in FIG. 10A. Further, the client device (1026) may include and/or perform at least a portion of one or more embodiments of the disclosure.

The computing system or group of computing systems described in FIGS. 10A and 10B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the disclosure. The processes may be part of the same or different application and may execute on the same or different computing system.

Rather than or in addition to sharing data between processes, the computing system performing one or more embodiments of the disclosure may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the disclosure, may extract one or more data items from the obtained data. For example, the extraction may be performed as follows by the computing system in FIG. 10A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where tokens may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 10A, while performing one or more embodiments of the disclosure, may perform data comparison. Data comparison may be used to compare two or more data values (e.g., A, B). For example, one or more embodiments may determine whether A>B, A=B, A!=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the disclosure, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 10A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 10A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 10A and the nodes and/or client device in FIG. 10B. Other functions may be performed using one or more embodiments of the disclosure.

While the disclosure has been described with respect to a limited number of embodiments, those skilled in the art, having benefit of this disclosure, will appreciate that other embodiments may be devised which do not depart from the scope of the disclosure. Accordingly, the scope of the disclosure should be limited only by the attached claims.

What is claimed is:

1. A method comprising:
   receiving, by an object with a plurality of fields, a first plurality of read requests that include a plurality of received field names of a plurality of fields of the object;
   retrieving a plurality of field values of the plurality of fields from a plurality of hash chains for the plurality of fields of the object by:
      identifying the respective hash chain from a plurality of hash chains of the object that corresponds to the respective field,
      and identifying an end block of the respective hash chain that includes the respective field value;
generating a plurality of responses to the first plurality of read requests each including the field value from the end block of the respective hash chain;
transmitting the plurality of responses;
receiving, by the object, a plurality of write requests that include a plurality of updated field values of the plurality of fields; and
adding, to the plurality of hash chains for the plurality of fields, a plurality of new blocks comprising the plurality of updated field values of the plurality of fields.

2. The method of claim 1, further comprising:
locking the object and queuing a second plurality of read requests after receiving the first plurality of read requests and before retrieving the plurality of field values.

3. The method of claim 2, further comprising:
retrieving a previous hash value.

4. The method of claim 3, further comprising:
generating, after retrieving the plurality of field values, a verification hash value from a field value of the plurality of field values and the previous hash value.

5. The method of claim 4, further comprising:
verifying the field value by comparing the verification hash value to a retrieved hash value.

6. The method of claim 2, further comprising:
unlocking the object and processing the second plurality of read requests after transmitting the plurality of responses.

7. A method comprising:
receiving, by an object with a plurality of fields, a first plurality of read requests that include a plurality of received field names of a plurality of fields of the object;
retrieving a plurality of field values of the plurality of fields from a hash chain of the object by:
    identifying a plurality of object field block identifiers that correspond to the plurality of fields and are stored separately from the hash chain by the object, and
    identifying a plurality of blocks that include the plurality of field values and are in the hash chain using the plurality of object field block identifiers without traversing the hash chain;
generating a plurality of responses to the first plurality of read requests that include the plurality of field values;
transmitting the plurality of responses;
receiving, by the object, a plurality of write requests that include a plurality of updated field values of the plurality of fields;
adding, to the hash chain, a plurality of new blocks comprising the plurality of updated field values of the plurality of fields; and
updating the plurality of object field block identifiers to refer to the plurality of new blocks.

8. The method of claim 7, further comprising:
locking the object and queuing a second plurality of read requests after receiving the first plurality of read requests and before retrieving the plurality of field values.

9. The method of claim 8, further comprising:
retrieving a previous hash value.

10. The method of claim 9, further comprising:
generating, after retrieving the plurality of field values, a verification hash value from a field value of the plurality of field values and the previous hash value.

11. The method of claim 10, further comprising:
verifying the field value by comparing the verification hash value to a retrieved hash value.

12. The method of claim 8, further comprising:
unlocking the object and processing the second plurality of read requests after transmitting the plurality of responses.

13. A method comprising:
receiving, by an object with a plurality of fields, a plurality of read requests that include a plurality of received field names of a plurality of fields of the object;
for each field of the plurality of fields, retrieving a field value from a first hash chain of a plurality of hash chains for the plurality of fields of the object by:
    traversing a second hash chain of the plurality of hash chains to locate a second block of the second hash chain that corresponds to the field and that includes a field block identifier that identifies a first block of the first hash chain, and
    identifying the first block of the first hash chain that includes the field value using the field block identifier from the second block;
generating a plurality of responses to the plurality of read requests that include the field value of the respective field;
transmitting the plurality of responses;
receiving, by the object, a plurality of write requests that include a plurality of updated field values of the plurality of fields;
for each field of the plurality of fields, adding, to the first hash chain, a new block comprising the respective updated field value of the respective field; and
updating the field block identifier of the second block of the second hash chain to refer to the respective new block.

14. The method of claim 13, further comprising:
locking the object and queuing a second plurality of read requests after receiving the first plurality of read requests and before retrieving the plurality of field values.

15. The method of claim 14, further comprising:
retrieving a previous hash value.

16. The method of claim 15, further comprising:
generating, after retrieving the plurality of field values, a verification hash value from a field value of the plurality of field values and the previous hash value.

17. The method of claim 16, further comprising:
verifying the field value by comparing the verification hash value to a retrieved hash value.

18. The method of claim 14, further comprising:
unlocking the object and processing the second plurality of read requests after transmitting the plurality of responses.

19. A system comprising:
a memory coupled to a processor,
wherein the memory comprises:
    an object with a plurality of fields,
    a plurality of hash chains that is included by the object and that includes a history hash chain and a plurality of field hash chains, and
    a plurality of blocks in the plurality of hash chains that include a first plurality of field values of the plurality of fields,
        wherein the plurality of blocks are included in the history hash chain and the plurality of field hash chains;

wherein the object executes on the processor, uses the memory, and is configured for:
    receiving, by the object, a plurality of read requests that include a plurality of received field names of a plurality of fields of the object,
    retrieving the plurality of field values of the plurality of fields, which correspond to the plurality of received field names from the plurality of field hash chains of the object,
    generating a plurality of responses to the first plurality of read requests that include the plurality of field values,
    transmitting the plurality of responses;
    receiving, by the object, a plurality of write requests that include a plurality of updated field values of the plurality of fields; and
    adding, to the history hash chain and the plurality of field hash chains of the object, a plurality of new blocks comprising the plurality of updated field values of the plurality of fields.

20. The system of claim 19,
wherein when an ordinal number of the block is a multiple of an ordinal value, one of the plurality of blocks is a summary block that identifies a set of field values for the plurality of fields using one of the plurality of field values and a set of field block identifiers that identify a set of field hash chain blocks that include the set of field values.

21. The system of claim 20, wherein the object is further configured for:
    locking the object and queuing a second plurality of read requests after receiving the first plurality of read requests and before retrieving the plurality of field values.

22. The system of claim 21, wherein the object is further configured for:
    retrieving a previous hash value.

23. The system of claim 22, wherein the object is further configured for:
    generating, after retrieving the plurality of field values, a verification hash value from a field value of the plurality of field values and the previous hash value.

24. The system of claim 23, wherein the object is further configured for:
    verifying the field value by comparing the verification hash value to a retrieved hash value.

25. The system of claim 21, wherein the object is further configured for:
    unlocking the object and processing the second plurality of read requests after transmitting the plurality of responses.

* * * * *